United States Patent
Kubo et al.

(10) Patent No.: US 7,332,711 B2
(45) Date of Patent: Feb. 19, 2008

(54) PHOTOELECTRIC ENCODER, SCALE THEREFOR AND METHOD FOR MANUFACTURING THE SAME

(75) Inventors: Tetsuhiko Kubo, Utsunomiya (JP); Yukinari Nozawa, Utsunomiya (JP)

(73) Assignee: Mitutoyo Corporation, Kawasaki-shi (JP)

( * ) Notice: Subject to any disclaimer, the term of this patent is extended or adjusted under 35 U.S.C. 154(b) by 49 days.

(21) Appl. No.: 11/296,985

(22) Filed: Dec. 8, 2005

(65) Prior Publication Data

US 2007/0007445 A1    Jan. 11, 2007

(30) Foreign Application Priority Data

Dec. 9, 2004   (JP)   ............................. 2004-356411

(51) Int. Cl.
*G01D 5/36* (2006.01)
*H03M 1/22* (2006.01)

(52) U.S. Cl. ............................. 250/237 G; 250/231.16; 341/14; 341/17

(58) Field of Classification Search ............. 250/231.1, 250/213.11–231.16, 231.18, 231.37; 341/14, 341/17
See application file for complete search history.

(56) References Cited

U.S. PATENT DOCUMENTS

| | | | |
|---|---|---|---|
| 4,926,566 A | | 5/1990 | McMurtry et al. |
| 5,155,355 A | * | 10/1992 | Kabaya .................. 250/237 G |
| 6,445,456 B2 | * | 9/2002 | Speckbacher et al. ...... 356/499 |
| 6,588,333 B1 | | 7/2003 | Homer et al. |
| 6,610,975 B2 | * | 8/2003 | Ito et al. ................. 250/231.16 |
| 6,621,068 B2 | * | 9/2003 | Aoki et al. ............ 250/231.14 |
| 6,635,863 B1 | * | 10/2003 | Nihommori et al. ... 250/231.13 |
| 7,057,160 B2 | * | 6/2006 | Ito ........................ 250/231.13 |
| 7,064,842 B1 | * | 6/2006 | Yamamoto et al. ......... 356/499 |
| 7,102,759 B2 | * | 9/2006 | Yamamoto .................. 356/499 |
| 2003/0155491 A1 | * | 8/2003 | Ito et al. ................ 250/231.13 |
| 2005/0064057 A1 | * | 3/2005 | Morita ................... 425/192 R |
| 2005/0157307 A1 | * | 7/2005 | Yamamoto et al. ......... 356/499 |

FOREIGN PATENT DOCUMENTS

| | | |
|---|---|---|
| JP | 2000-275065 | 10/2000 |
| JP | 2003-512611 | 4/2003 |
| WO | WO 2004/008079 | 1/2004 |

OTHER PUBLICATIONS

WO 03/061891 A2, Laser Mrking, Publication Date: Jul. 31, 2003. (Discussed on p. 2 of spec.).

* cited by examiner

*Primary Examiner*—Linh V. Nguyen
(74) *Attorney, Agent, or Firm*—Rankin, Hill, Porter & Clark LLP

(57) ABSTRACT

A main scale 10 has protrusive grating 12 of a thin film of e.g. Cr formed on a base member 11. The base member 11 and the Cr thin film constitute a reflecting face which is set to provide the sufficient quantity of received light on a light receiving side. The protrusive grating 12 can be formed accurately by photo-etching the thin film.

12 Claims, 4 Drawing Sheets

PHOTOELECTRIC ENCODER, SCALE THEREFOR AND METHOD FOR MANUFACTURING THE SAME

The present application claims foreign priority based on Japanese Patent Application No. 2004-356411, filed Dec. 9, 2004, the content of which is incorporated herein by reference.

BACKGROUND OF THE INVENTION

1. Technical Field

This invention relates to a photoelectric encoder for detecting a position, angle, speed, angular speed, etc., a scale therefor and a method for manufacturing the same.

2. Related Art

Generally, the photoelectric encoder includes a main scale, an index scale, a light source, and a light receiving section. The main scale extends along a measuring axis. The index scale is provided so as to move relatively to the main scale. The light source projects light onto the main scale through the index scale. The light receiving section receives, through the index scale, the light emitted from the light source and reflected from the main scale. The main scale and the index scale have scale divisions formed with a predetermined pitch, respectively. By optically detecting changes in the phase of the scale divisions formed on both scales by relative movement therebetween, the position of the index scale relative to the main scale is detected.

Meanwhile, where it is necessary to from a very long scale as the main scale in the use of a large scale measuring machine for e.g. vehicle body measurement, it is difficult to form the main scale of a glass scale. For this reason, in this kind of use, a metallic scale formed of a stainless tape has been used. As a method for manufacturing the metallic scale, as disclosed in e.g. JP-T-2003-512611 (paragraphs 0010 to 0012, FIGS. 1, 2 and 5) (which is hereinafter referred as Patent Reference 1), the method is known comprising the steps of forming dips and bumps on the surface of a tape-like scale when the scale passes between rollers with uneven contours and of unifying the height of the bumps by an additional processing of passing the tape between flat rollers. Further, as disclosed in WO03/061891 (page 7, line 29 to page 8, line 7, FIG. 2) (which is hereinafter referred as Patent Reference 2), there is a known method for manufacturing the scale by making scale divisions on a stainless ribbon by laser light.

However, the scale disclosed in Patent Reference 1 can be manufactured easily but the accuracy of each bump and each dip formed on the scale is low. Therefore, this scale can be used in the use of assuring the accuracy by an averaging effect of the detection signal outputted from the light receiving section by receiving the light from plurality sets of grids as detection area on the scale. However, this scale cannot be used for a displacement measuring machine requiring high accuracy.

Further, the scale disclosed in Patent Reference 2 provides a preferable accuracy of the scale divisions. However, the apparatus for manufacturing this scale becomes a large-scale so that the production cost of the scale is high. Further, in this scale, the area of scale divisions constitute a non-reflecting face. Therefore, light is absorbed in this area and the quantity of light received by the light receiving section is lowered. In the case of such a kind of ribbon-shaped scale, the scale gives undulation so that a change of gap between the scale and the light receiving section is large and so an error is likely to occur with a minute signal. Thus, if the scale divisions constitute a light absorbing area, the S/N is lowered owing to shortage of signal strength.

SUMMARY OF THE INVENTION

This invention has been accomplished in view of these problems. An object of this invention is to provide a photoelectric encoder which gives accurate scale divisions and an improved S/N, a scale therefor and a method for manufacturing the same.

In order to attain the above object, the scale for a photoelectric encoder according to this invention is characterized by comprising a tape-like base member; a plurality of protrusive grating of a thin film formed on a surface of the base member and arranged with a predetermined pitch in a longitudinal direction of the base member, wherein dips and bumps formed in the longitudinal direction of the base member by the plurality of protrusive grating constitute scale divisions and serve as an optical reflecting face.

In an embodiment of this invention, the dips are the surface of the base member which constitutes the reflecting face; and the bumps are the surface of the plurality of protrusive grating which constitutes the reflecting face.

In another embodiment of this invention, there is provided a reflecting film covering the base member on which the protrusive grating are formed, and dips and bumps formed of the reflecting film constitute the optical reflecting face.

Now, where the dips are the surface of the base member, the base member is formed of a stainless tape with e.g. the surface lapping-treated. In addition, the thin film and/or the reflecting film are formed of a Cr thin film. Further, assuming that the wavelength of light emitted from a light source of the photoelectric encoder used is $\lambda$ and an incident angle for the scale is $\theta$, a level difference d between the dips and the bumps is preferably set as $$\lambda/(4\cdot\cos\theta)\times0.8 < d < \lambda/(4\cdot\cos\theta)\times1.2.$$

The photoelectric encoder according to this invention is characterized by comprising: the scale described above; an index scale moving relatively to the scale and having other scale divisions corresponding to the scale divisions of the scale; a light source which moves relatively to the scale together with the index scale for projecting light onto the scale through the index scale; and a light receiving section for the light emitted from the light source and reflected from the scale.

Further, the method for manufacturing a scale for a photoelectric encoder according to this invention is characterized by comprising the steps of: forming a thin film on the surface of a tape; and etching the thin film to form a plurality of protrusive grating with a predetermined pitch in a longitudinal direction of the tape on the surface thereof.

In this case, the method for manufacturing a scale for a photoelectric encoder may further comprises the step of forming a reflecting film on the tape on which the plurality of protrusive grating are formed. The tape and thin film may be made of metal.

In accordance with this invention, a plurality of protrusive grating are formed with a predetermined pitch in a longitudinal direction of the base material by a thin film formed on a surface of the base member, and dips and bumps formed by these plurality of protrusive grating constitute scale divisions. For this reason, the machining accuracy of the scale divisions is high. Further, since the dips and bumps are both serve as a light reflecting face, the quantity of light received by the light receiving section of the encoder, i.e. signal strength can be enhanced, thereby improving the S/N.

DETAILED DESCRIPTION OF THE INVENTION

Figure 1:
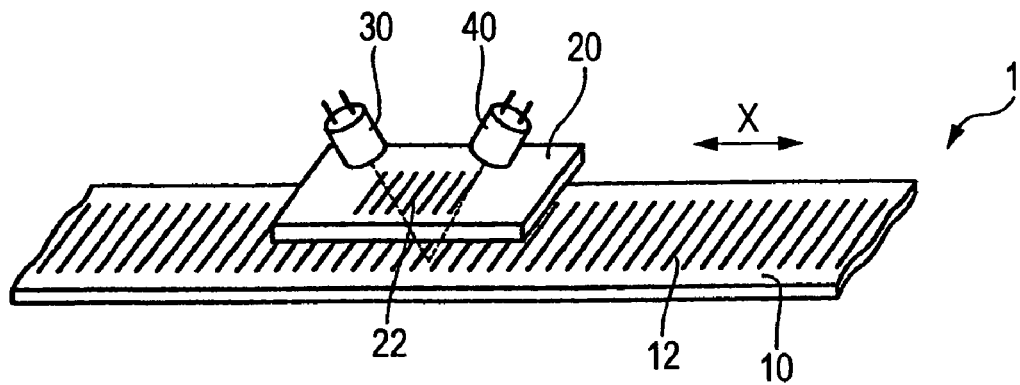
FIG. 1 is a perspective view showing the schematic structure of a photoelectric encoder according to an embodiment of this invention.

Now referring to the drawings, a detailed explanation will be given of an embodiment of this invention.

FIG. 1 is a perspective view showing the schematic structure of a photoelectric encoder according to an embodiment of this invention. A photoelectric encoder 1 includes a main scale 10, an index scale 20, a light source 30, and a light receiving section 40.

The main scale 10 extends along a measuring axis. The index scale 20 is provided so as to move relatively to the main scale 10. The light source 30 projects light onto the main scale 10 through the index scale 20. The light receiving section 40 receives, through the index scale 20, the light emitted from the light source 30 and reflected from the main scale 10. The main scale 10 and the index scale 20 have protrusive grating 12 and marks 22 serving as scale divisions formed with a predetermined pitch, respectively. In such a manner that the light receiving section 40 detects changes in the phase of the scale divisions formed on both scales 10, 20 by relative movement therebetween, the position of the index scale 20 relative to the main scale 10 is detected.

FIG. 2(a) is a partially enlarged plan view of the main scale 10; and FIG. 2(b) is a sectional view taken in line A-A' in FIG. 2(a).

The main scale 10 has the protrusive grating 12 of a thin film of e.g. Cr formed on a base member 11. The base member 11 is formed of a metallic ribbon of e.g. stainless having a thickness of e.g. about 0.2 to 0.5 mm and is preferably lapping-treated in the surface. The protrusive grating 12 are formed as grids with a pitch of 10 to 30 μm by photo-etching a thin film, for example. Now assuming that the wavelength of light emitted from the light source 30 is λ and an incident angle thereof is θ, a level difference d between the dips and bumps formed by the protrusive grating 12 is preferably set as $$d = \lambda/(4 \cdot \cos \theta)$$

Figure 3:
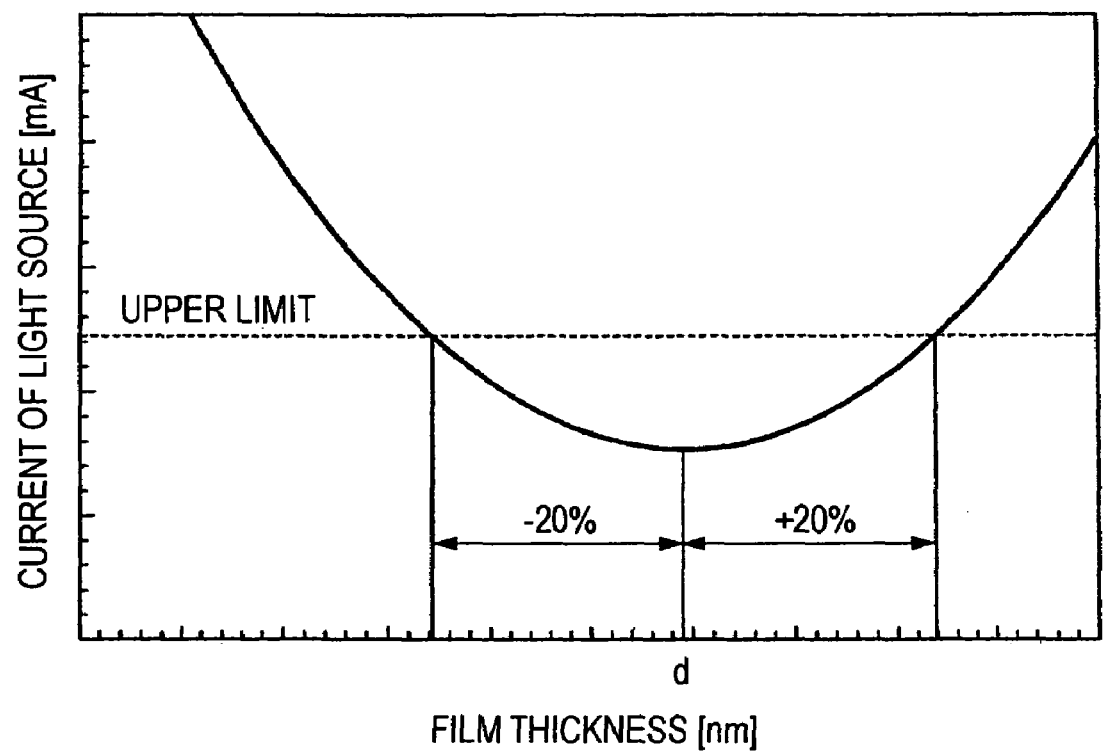
FIG. 3 is a graph showing the relationship between the thickness of a thin film in the scale and a current of light source.

Additionally, according to experiments by inventors of this invention, as seen from FIG. 3, if the film thickness becomes larger or smaller than an ideal level difference d, the quantity of reflected light decreases. As a result, if a desired signal amplitude is required, the current value of the light source must be increased. In this case, if the level difference d changes from its ideal value by ±20%, the current value of the light source reaches its upper limit. Therefore, the level difference d is preferably set within the following range.

$$\lambda/(4 \cdot \cos \theta) \times 0.8 < d < \lambda/(4 \cdot \cos \theta) \times 1.2$$

Next, an explanation will be given of the method for manufacturing the main scale 10.

Figure 4:
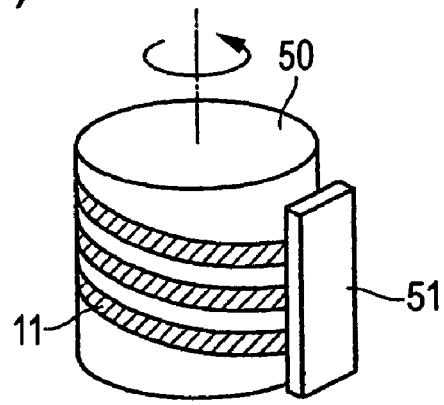
FIG. 4 is views for explaining the method for manufacturing the scale.
Figure 4:
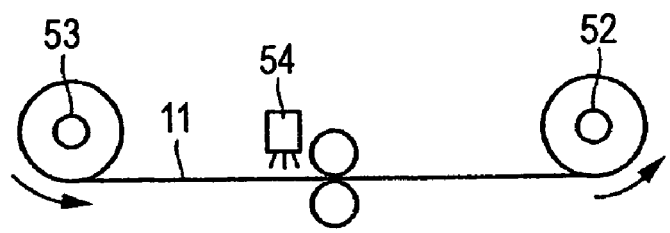
Figure 4:
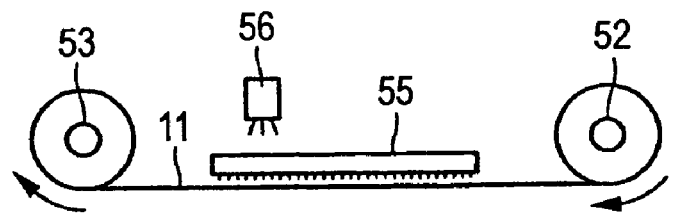
Figure 4:
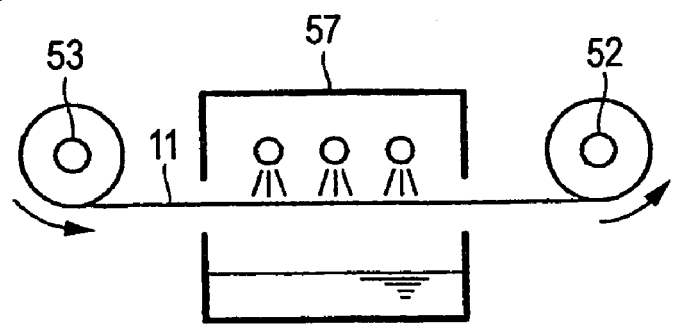

FIG. 4 is a view which schematically shows an example of the method for manufacturing the main scale 10.

First, a stainless ribbon serving as the base member 11 is wound around a drum 50. A target member 51 of Cr is oppositely arranged. By sputtering, a thin film of Cr is formed on the stainless ribbon (FIG. 4(a)).

Next, while the stainless ribbon 11 with the thin film of Cr formed thereon is sequentially moved by back-and-forth rewinding between rollers 52 and 53, resist (photosensitive agent) is uniformly applied on the Cr thin film by a resist applying device 52 (FIG. 4(b)).

Next, the light emitted from a light source 56 is projected onto the resist through a mask 55 with grids formed with a predetermined pitch so that the pattern corresponding to the scale divisions is exposed to light (FIG. 4(c)). Using the resist left in a grid pattern as an etching mask by development, the thin film is etched by an etching device 57 (FIG. 4(d)).

In this way, a scale with high accuracy can be manufactured by simple instrument.

Incidentally, in this embodiment, the base member was formed of the stainless tape and the thin film was formed of Cr. In other applications, the base member may be formed of e.g. aluminum or copper, and the thin film may be formed of e.g. gold, silver or aluminum. However, the stainless tape is optimum as the base member permitting more accurate measurement. This is because the stainless tape gives less thermal expansion and higher strength than aluminum or copper and also sufficient flatness as the base member for placing the thin film thereon. As for the thin film, the Cr thin film is inferior to the aluminum thin film in reflectance, but is higher in hardness than the aluminum thin film. So the Cr thin film is difficult to be damaged and can be easily handled. Therefore, all things considered from the standpoint of strength, reflectance and control of the thickness (height) of the deposited film, the cr thin film is optimum.

Figure 5:
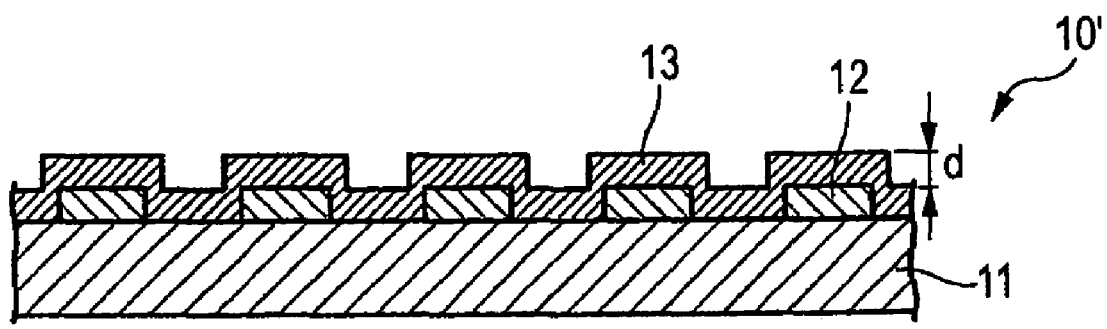
FIG. 5 is a sectional view of another embodiment of this invention.

FIG. 5 is a sectional view of a main scale 10' according to another embodiment of this invention.

In this embodiment, the protrusive grating 12 are formed on the one surface of the base member 11 of e.g. the stainless ribbon and further a reflecting film 13 of e.g. Cr having a predetermined thickness is formed on the entire surface so as to keep the shape of the dips and bumps formed by the protrusive grating 12.

In accordance with such a structure, the surface reflectance of the base member 11 and protrusive grating 12 can be optionally set. If the reflecting film 13 coated on the entire surface is formed of a metal such as Cr having a predetermined reflectance, a desired performance can be easily assured.

Incidentally, in this embodiment, the reflecting film was formed of Cr. In other applications, the reflecting film may be formed of e.g. gold, silver or aluminum. However, the Cr reflecting film is inferior to the aluminum reflecting film in reflectance, but is higher in hardness than the aluminum reflecting film. So the Cr reflecting film is difficult to be damaged and can be easily handled. Therefore, all things considered from the standpoint of strength, reflectance and control of the thickness (height) of the deposited film, the Cr reflecting film is optimum.

Figure 2:
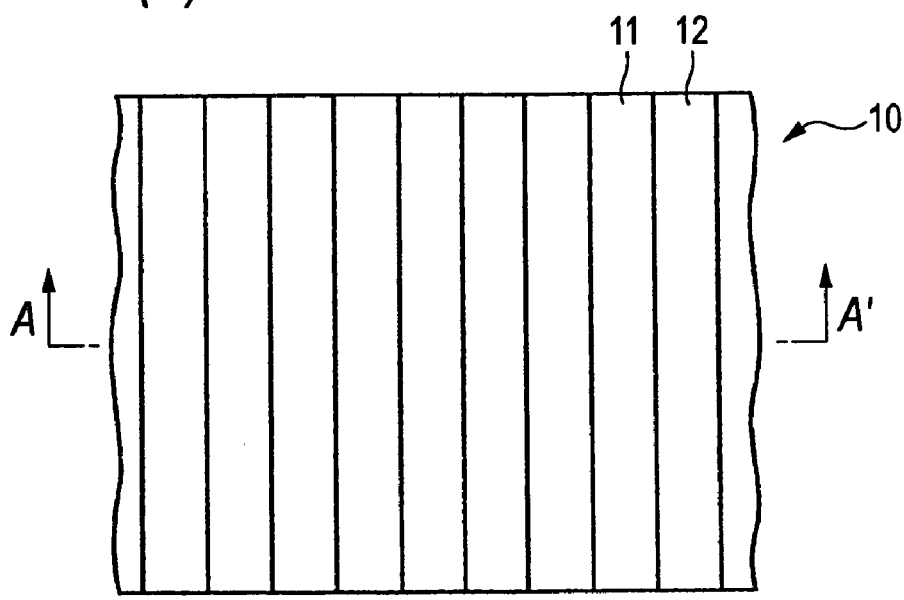
FIG. 2 is a plan view and a sectional view of the scale used in the photoelectric encoder.
Figure 2:
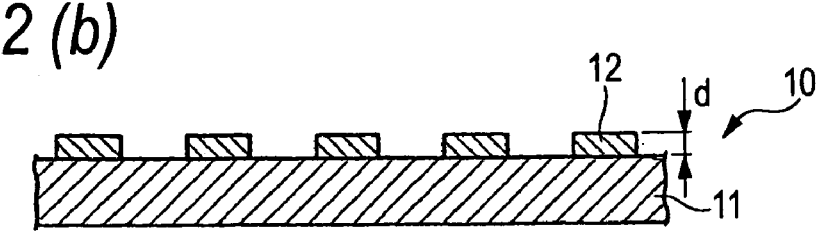

Further, as with the embodiment as shown in FIG. 2, a level difference d between the dips and bumps formed by the protrusive grating 12 and the reflecting film 13 is preferably set within the following range.

$$\lambda/(4 \cdot \cos \theta) \times 0.8 < d < \lambda/(4 \cdot \cos \theta) \times 1.2$$

We claim:

1. A scale for a photoelectric encoder comprising
a tape-like metal base member;
a protrusive grating formed on a surface of the base member and arranged with a predetermined pitch in a longitudinal direction of said base member, said protrusive grating being a thin film,
wherein dips and bumps formed in the longitudinal direction of said base member by said protrusive grating constitute scale divisions, said dips and bumps cooperating to define an optical reflecting face of said scale.

2. The scale for a photoelectric optical encoder according to claim 1, wherein
said dips are provided by said base member, said dips having a surface that constitutes a portion of the reflecting face; and
said bumps are provided by said protrusive grating, said bumps having a surface that constitutes a portion of the reflecting face.

3. The scale for a photoelectric encoder according to claim 1, further comprising:
a reflecting film covering said base member and said protrusive grating,
wherein the dips and the bumps formed of said reflecting film constitute the optical reflecting face.

4. The scale for a photoelectric encoder according to claim 2, wherein the thin film is formed of metal.

5. The scale for a photoelectric encoder according to claim 2, wherein said base member is formed of a stainless tape with the surface thereof being lapping-treated.

6. The scale for a photoelectric encoder according to claim 2, wherein said thin film is formed of a Cr thin film.

7. The scale for a photoelectric encoder according to claim 3, wherein said reflecting film is formed of a Cr thin film.

8. The scale for a photoelectric encoder according to claim 1, wherein a level difference d between the dips and the bumps is within the range:

$$\lambda/(4\cdot\cos\theta)\times 0.8 < d < \lambda/(4\cdot\cos\theta)\times 1.2,$$

wherein $\lambda$ is a wavelength of light emitted from a light source of the photoelectric encoder and $\theta$ is an angle of incidence of the light relative to the scale.

9. A photoelectric encoder comprising:
a scale for a photoelectric encoder, the scale comprising:
a tape-like metal base member;
a protrusive grating formed on a surface of the base member and arranged with a predetermined pitch in a longitudinal direction of said base member, wherein dips and bumps formed in the longitudinal direction of said base member by said protrusive grating constitute scale divisions, said dips and bumps cooperating to define an optical reflecting face of said scale, said protrusive grating being a thin film;
an index scale that is movable relative to said scale and having other scale divisions corresponding to the scale divisions of said scale;
a light source that is movable relative to said scale together with said index scale for projecting light onto said scale through said index scale; and
a light receiving section for receiving the light emitted from said light source and reflected from the optical reflecting face of said scale.

10. A method for manufacturing a scale for a photoelectric encoder comprising the steps of:
forming a thin film on a surface of a metal tape; and
etching said thin film to reveal portions of the surface of the tape and thereby form a protrusive grating with a predetermined pitch in a longitudinal direction of said tape on the surface thereof,
wherein said thin film and said revealed tape surface cooperate to define an optical reflective face of said scale.

11. The method for manufacturing a scale for a photoelectric encoder according to claim 10, further comprising the step of:
forming a reflecting film on the tape on which the protrusive grating is formed, said reflecting film covering said protrusive grating and said revealed surface of said tape.

12. The method for manufacturing a scale for a photoelectric encoder according to claim 10, wherein the thin film is formed of metal.

* * * * *